United States Patent Office 3,166,575
Patented Jan. 19, 1965

3,166,575
2(2-METHYL-1-PROPENE)-YL - 4 -METHYL-TETRA-HYDRO-PYRANS AND 2(2-METHYL-2-PROPENE)-YL-4-METHYL-TETRAHYDRO-PYRANS
Yves Rene Naves, Petit-Lancy, near Geneva, and Paul Tullen, Satigny, near Geneva, Switzerland, assignors to The Givaudan Corporation, New York, N.Y., a corporation of New Jersey
No Drawing. Filed Mar. 7, 1962, Ser. No. 177,986
Claims priority, application Switzerland, Mar. 15, 1961
7 Claims. (Cl. 260—345.1)

The present invention relates to substituted tetrahydropyrans, a process for preparing same and to perfume compositions made therewith.

The process of this invention deals with the transformation of β-citronellol, or esters thereof, into 2,6-dimethyl-octene-2-diol-4,8, and the conversion of the latter into a mixture of (methyl-2-propene-1)-yl-2-methyl-4-tetrahydro-pyrans and (methyl-2-propene-2)-yl-2-methyl-4-tetrahydro-pyrans.

The aforementioned substituted tetrahydro-pyrans either singly or in admixture, have been found to have the unexpected property of imparting to artificial geranium oil, and perfume compositions containing same, odor qualities possessed by natural oil of geranium. Also, said tetrahydropyrans enhance the odor qualities of natural oil of geranium itself, as well as compositions containing same.

The process of this invention may be illustrated as follows, employing β-citronellol as the starting material:

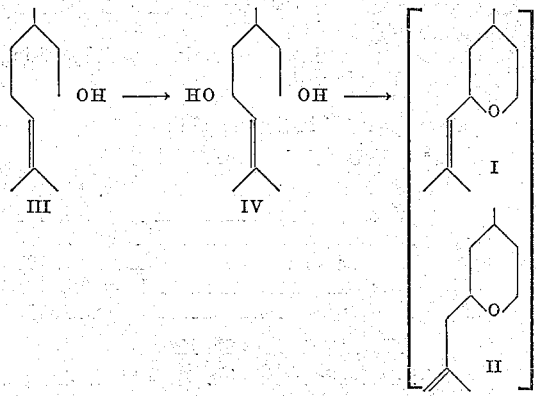

I—(methyl-2-propene-1)-yl-2-methyl-4-tetrahydro-pyrans
II—(methyl-2-propene-2)-yl-2-methyl-4-tetrahydro-pyrans
III—β-citronellol
IV—2,6-dimethyl-octene-2-diol-4,8.

In place of β-citronellol, esters thereof may be used. Thus, for example, aliphatic carboxylic esters such as the acetates, oxalates and succinates, may be employed.

In carrying out the process, as exemplified by β-citronellol as the starting material, oxygen or an oxygen-containing gas, such as air, is caused to react with the β-citronellol at an elevated temperature so as to form the corresponding hydroperoxide. This is then reduced in known manner to the 2,6-dimethyl-octene-3-diol-2,8. In the presence of known dehydrating agents this diol is isomerized to the diol IV and the latter is dehydrated and cyclized to a mixture of I and II.

Where an ester of β-citronellol is employed as the starting material, the procedure is as above stated, except that after the corresponding hydroperoxide is reduced it is saponified in order to form the diol IV.

In carrying out the process of this invention, the following conditions are employed. The temperature at which peroxidation is conducted may vary between about 20° C. and 80° C. The peroxidation is continued until the peroxide index is between about 15 and 25 milligrams of active oxygen per gram of product.

As aforesaid, the hydroperoxide formed in accordance with the present process may be reduced in known manner to the 2,6-dimethyl-octene-3-diol-2,8 (where β-citronellol is employed as the starting material), or to a mono-ester of 2,6-dimethyl-octene-3-diol-2,8 (where an ester of β-citronellol is employed as starting material). An example of a method of carrying out this reduction is the use of a slightly alkaline, aqueous solution of sodium sulfite.

As aforesaid, the dehydration of the diol IV resulting from isomerization of 2,6-dimethyl-octene-3-diol-2,8 is conducted in known manner. This step may be carried out either in the liquid phase or in the gaseous phase. Conventional dehydration agents may be used. Examples of such agents include sulphuric acid, phosphoric acid, para-toluene-sulfonic acid, potassium hydrogen sulfate, aluminum silicate, etc.

It will be understood that each of the oxides, I and II, exists in two stereoisomeric forms, i.e., the cis and trans forms. It has been found that all of the resulting four forms, i.e., cis-I, trans-I, cis-II and trans-II per se or in admixture, possess the aforementioned unexpected olfactory properties of imparting a natural character to synthetic geranium oil and of enhancing the odor qualities of any of the natural oils of geranium. Amounts of the oxides as low as about 0.1% to about 4%, by weight, based on the weight of the artificial oil have the described effect, 1% being the amount normally preferred. Amounts of the oxides from about 1% to about 3%, by weight, based on the weight of the natural oil of geranium, markedly increase the strength of this oil, regardless of the source of the natural oil.

In order to illustrate our invention the following examples are given. The parts are by weight.

EXAMPLE I

β-citronellol, $\alpha_D = +3.61°$, was stirred in an atmosphere of oxygen between 50° C. and 60° C. until a peroxide index of 23, corresponding to the formation of about 25% of hydroperoxide, was obtained. This index is expressed in milligrams of active oxygen per gram of product.

A mixture of 100 parts of the resulting product and 30 parts of methanol is introduced into a solution of 32 parts of crystallized sodium sulfite (1.5 times theory) and 0.64 part of sodium hydroxide in 100 parts of water, under agitation and maintaining the temperature just under 30° C. The solution is agitated for 15 hours at room temperature and then for 2 hours at 75° C. The peroxide index, as a result, is lowered to 0.3. The cooled solution is then diluted with 100 parts of water, and then extracted with benzene. The extract was then worked and neutralized and the crude product was then distilled systematically.

Besides unchanged β-citronellol, there was obtained:

(a) *2,3-epoxy-2,6-dimethyl-octanol-8.* — E=95–96°/2 Torr; $d_4^{20}=0.9290$; $n_D^{20}=1.4482$; $[\alpha]_D^{20}=+3.44°$; C=69.63%, H=11.89% (calculated: C=69.72%, H=11.70%). The infrared absorption spectrum is identical with that of the product obtained by treating β-citronellol with perbenzoic acid.

(b) *2,6-dimethyl-octene-3-diol - 2,8.*—E=110–112°/2 Torr; $d_4^{20}=0.9410$; $n_D^{20}=1.4710$; $[\alpha]_D^{20}=+2.85°$. Hydrogenation of this diol yielded 2,6-dimethyl-octanediol-2,8 whose infrared absorption spectrum is identical with that of the product obtained by the hydrogenation of 2-hydroxy-dihydro-citronellal.

The foregoing products (a) and (b) were obtained in the ratio of 2 to 3.

[Methyl-2-propene]-yl-2-methyl-4-tetrahydro-pyrans (a) *From 2,3-epoxy-2,6-dimethyl-octanol-8.*—One hundred parts of 2,3-epoxy-2,6-dimethyl-octanol-8 were treated with 500 parts of an aqueous solution containing 4 parts per thousand of sulfuric acid, forming 2,6-dimethyl-octanetriol-2,3,8. The crude product was treated for 6 hours with 2 parts of p-toluene sulfonic acid in the presence of 250 parts of benzene, using a distilling apparatus permitting continuous circulation (cohobation). The crude product, washed and neutralized, was then distilled. There was obtained an oxides fraction (10 parts) comprising 40% of [methyl-2-propene-1]-yl-2-methyl-4-tetrahydro-pyrans and 50% of [methyl-2-propene-2]-yl-2-methyl-4-tetrahydro-pyrans.

(b) *From 2,6-dimethyl-octene-3-diol-2,8.*—One hundred parts of the starting diol and 1000 parts of a 5% aqueous solution of sulfuric acid were emulsified at room temperature. Allylic rearrangement to form 2,6-dimethyl-octene-2-diol-4,8 followed by cyclization takes place in acid. After 3 hours, the mixture was extracted with ether. The crude product distilled to give a mixture of oxides having the following constants: $E=72–73°/15$ Torr; $d_4^{20}=0.8723$; $n_D^{20}=1.4566$; $[\alpha]_D^{20}=+38.10°$. Vapor chromatography over Reoplex 100 of Geigy to 25% over Celite, at 100° C., in hydrogen effluent to the atmosphere at the rate of 60 ml./min. showed only the two peaks of cis- and trans-[methyl-2-propene-1]-yl-2-methyl-4-tetrahydro-pyrans. The yield of these products amounted to 72 parts. The ratio of the two constituents was 85% of cis and 15% of trans. Examination of the infrared absorption spectrum confirms this finding.

EXAMPLE 2

β-citronellyl-acetate, $\alpha_D=+2.30°$ was treated, between 50° C. and 60° C., with a current of air until the peroxide index became 15.6.

One hundred parts of the resulting peroxides product was reduced, under agitation, with 250 parts of an aqueous solution containing 50 parts of crystallized sodium sulfite and 1 part of sodium carbonate. The crude products were distilled. There was obtained, besides unchanged β-citronellyl acetate:

(a) *2,6-dimethyl-octadiene-1,3-ol-8 acetate.*—
$E=81.82°/3.5$ Torr; $d_4^{20}=0.9119$; $n_D^{20}=1.4645$; $[\alpha]_D^{20}=+11.07°$; C=73.61%, H=10.52% (calc.: C=73.43, H=10.27). Hydrogenation of this product gave dihydro-citronellyl acetate, identified by comparing its infrared spectrum with that of a known preparation.

(b) *2,3-epoxy-2,6-dimethyl-octanol-8 acetate.*—
$E=95–96°/3.5$ Torr; $d_4^{20}=0.9514$; $n_D^{20}=1.4397$; $[\alpha]_D^{20}=+2.19°$; C=67.23%, H=10.39% (calc.: C=67.25, H=10.35). Its infrared absorption spectrum is identical with that of the product obtained by treating β-citronellyl acetate with perbenzoic acid.

(c) *2,6-dimethyl-octene-3-diol-2,8-mono acetate.*—
$E=105–106°/3.5$ Torr; $d_4^{20}=0.9571$; $n_D^{20}=1.4537$; $[\alpha]_D^{20}=+2.0°$; C=67.32%; H=10.54% (calc.: C=67.25; H=10.35). This product was identified as in Example 1, following hydrolysis.

Products (a), (b) and (c) were obtained in the ratio of 4, 3 and 3. The esters were saponified with sodium hydroxide in methanol and the resulting products were then transformed into the oxides as in Example 1, the product of saponification of a and the product of hydrolysis of the saponification product of b being combined.

The foregoing illustrates the practice of this invention, which, however, is not to be limited thereby, but is to be construed as broadly as permissible in view of the prior art and limited solely by the appended claims.

We claim:
1. The process which comprises treating a first member selected from the group consisting of β-citronellol and an ester of β-citronellol with a second member selected from the group consisting of air and oxygen to form the corresponding hydroperoxide, reducing the latter to 2,6-dimethyloctene-3-diol-2,8, isomerizing the latter to 2,6-dimethyloctene-2-diol-4,8 and dehydrating and cyclizing the latter to form a mixture of (methyl-2-propene-1)-yl-2-methyl-4-tetrahydro-pyrans and (methyl-2-propene-2)-yl-2-methyl-4-tetrahydro-pyrans.

2. The process of claim 1, wherein the first member is β-citronellol.

3. The process of claim 1, wherein the acetate of β-citronellol is the first member.

4. The process of claim 2, wherein air is the second member.

5. The process of claim 3, wherein air is the second member.

6. The process of claim 4, wherein the dehydrating agent is toluene sulfonic acid.

7. The process of claim 5, wherein the dehydrating agent is toluene sulfonic acid.

References Cited in the file of this patent

UNITED STATES PATENTS

| | | |
|---|---|---|
| 1,882,200 | Steinmig | Oct. 11, 1932 |
| 2,169,984 | Weissenborn | Aug. 15, 1939 |
| 2,258,132 | Scott | Oct. 7, 1941 |
| 2,644,823 | Kauck et al. | July 7, 1953 |
| 2,679,476 | Joffre | May 25, 1954 |
| 3,014,045 | Marcus et al. | Dec. 19, 1961 |

OTHER REFERENCES

Seidel et al.: Helvetica Chimica Acta+vol. 42, pp. 1830, 1844 (1959).

Seidel et al.: Helvetica Chimica Acta, +44, pp. 598–606 (March 15, 1961).

Naves et al.: Societe Chimique de France+, Ser. 5, pp. 645–647 (March 1961). QD 1.S4.

Gouin, Annales de Chemie+, vol. 5, No. 5/6, pages 529–78 (1960).